(12) United States Patent
Holm

(10) Patent No.: US 11,662,291 B1
(45) Date of Patent: May 30, 2023

(54) SYSTEM AND METHOD FOR FEED VALIDATION MEASUREMENT

(71) Applicant: Atlantic Sapphire IP, LLC, Miami, FL (US)

(72) Inventor: Thue Holm, Vejle (DK)

(73) Assignee: ATLANTIC SAPPHIRE IP, LLC, Miami, FL (US)

( * ) Notice: Subject to any disclaimer, the term of this patent is extended or adjusted under 35 U.S.C. 154(b) by 101 days.

(21) Appl. No.: 17/351,997

(22) Filed: Jun. 18, 2021

Related U.S. Application Data

(60) Provisional application No. 63/145,195, filed on Feb. 3, 2021.

(51) Int. Cl.
| | | |
|---|---|---|
| *G01N 15/02* | (2006.01) | |
| *G01N 15/14* | (2006.01) | |
| *G06T 7/00* | (2017.01) | |
| *G06T 7/60* | (2017.01) | |

(52) U.S. Cl.
CPC ..... *G01N 15/0227* (2013.01); *G01N 15/1429* (2013.01); *G01N 15/1434* (2013.01); *G06T 7/001* (2013.01); *G06T 7/60* (2013.01); *G01N 2015/1493* (2013.01); *G06T 2207/30128* (2013.01)

(58) Field of Classification Search
CPC ........... G01N 15/0227; G01N 15/1429; G01N 15/1434; G01N 2015/1493; G06T 7/001; G06T 7/60; G06T 2207/30128
See application file for complete search history.

(56) References Cited

U.S. PATENT DOCUMENTS

| | | | |
|---|---|---|---|
| 2,643,481 | A | 6/1953 | Ederer |
| 3,200,949 | A | 8/1965 | Aulich |
| 3,771,492 | A | 11/1973 | Doherty |
| 3,832,720 | A | 8/1974 | Cook |
| 4,009,782 | A | 3/1977 | Grimshaw |
| 4,052,960 | A | 10/1977 | Birkbeck et al. |
| 4,067,809 | A | 1/1978 | Kato |
| 4,141,318 | A | 2/1979 | MacVane et al. |

(Continued)

FOREIGN PATENT DOCUMENTS

| | | | | |
|---|---|---|---|---|
| CA | 2711677 C | * | 11/2012 | ............ G01B 21/00 |
| CN | 102329055 | | 1/2012 | |

(Continued)

OTHER PUBLICATIONS

Van der Heile Tony et al., Composition, Treatment and Use of Saline Gorundwater for Aquaculture in the Netherlands, World Aquaculture, Jun. 2014, pp. 23-27, Nov. 2014.

(Continued)

*Primary Examiner* — Roy M Punnoose
(74) *Attorney, Agent, or Firm* — Malloy & Malloy PL

(57) ABSTRACT

A feed validation measuring system for monitoring and controlling the quality of aquaculture feed, and a method for validating feed by utilizing such a system. The system includes the utilization of a high contrast surface, which receives a predetermined number of feed pellets and a measurement reference object, a lighting assembly to light the high contrast surface, a camera assembly to capture images of objects on the high contrast surface, and a software component which analyzes images and calculates the size of each of the predetermined number of feed pellets by referencing the size of the measurement reference object.

20 Claims, 3 Drawing Sheets

(56) References Cited

U.S. PATENT DOCUMENTS

| | | | |
|---|---|---|---|
| 4,225,543 A * | 9/1980 | Hohman | B01J 2/14 |
| | | | 264/117 |
| 4,394,259 A | 7/1983 | Benny et al. | |
| 4,607,595 A | 8/1986 | Busot et al. | |
| 4,728,438 A | 3/1988 | Featherstone et al. | |
| 4,915,059 A | 4/1990 | Long | |
| 4,966,096 A | 10/1990 | Adey | |
| 5,038,715 A | 8/1991 | Fahs, II | |
| 5,123,195 A | 6/1992 | Hawkins | |
| 5,186,121 A | 2/1993 | Smith, Jr. | |
| 5,317,645 A | 5/1994 | Perozek et al. | |
| 5,385,428 A | 1/1995 | Taft, 3rd et al. | |
| 5,540,521 A | 7/1996 | Biggs | |
| 5,659,977 A | 8/1997 | Jensen et al. | |
| 5,732,654 A | 3/1998 | Perez et al. | |
| 5,961,831 A | 10/1999 | Lee et al. | |
| 5,978,315 A | 11/1999 | Molaug | |
| 5,979,362 A | 11/1999 | McRobet | |
| 6,041,738 A | 3/2000 | Hemauer et al. | |
| 6,065,430 A | 5/2000 | Sheriff | |
| 6,099,879 A | 8/2000 | Todd, Jr. | |
| 6,206,612 B1 | 3/2001 | Meyer | |
| 6,317,385 B1 | 11/2001 | Hedgepeth | |
| 6,382,134 B1 | 5/2002 | Gruenberg et al. | |
| 6,443,098 B1 | 9/2002 | Blyth et al. | |
| 6,447,681 B1 | 9/2002 | Carlberg et al. | |
| 6,474,264 B1 | 11/2002 | Grimberg et al. | |
| 6,499,431 B1 | 12/2002 | Lin et al. | |
| 6,722,314 B1 | 4/2004 | Crisinel et al. | |
| 6,902,675 B2 | 6/2005 | Kelly et al. | |
| 6,932,025 B2 | 8/2005 | Massingill et al. | |
| 6,986,323 B2 | 1/2006 | Ayers | |
| 6,988,394 B2 | 1/2006 | Shedd et al. | |
| 7,001,519 B2 | 2/2006 | Linden et al. | |
| 7,082,893 B2 | 8/2006 | Schreier et al. | |
| 7,462,284 B2 | 12/2008 | Schreier et al. | |
| 7,594,779 B2 | 9/2009 | Hildstad et al. | |
| 8,117,992 B2 | 2/2012 | Parsons et al. | |
| 8,141,515 B2 | 3/2012 | Nien | |
| 8,506,811 B2 | 8/2013 | Bradley et al. | |
| 8,535,883 B2 | 9/2013 | Cane et al. | |
| 8,633,011 B2 | 1/2014 | Palmer et al. | |
| 9,637,402 B2 | 5/2017 | Tal et al. | |
| 9,756,838 B2 | 9/2017 | Kunitomo et al. | |
| 10,034,461 B2 | 7/2018 | Holm et al. | |
| 10,660,315 B1 | 5/2020 | Alcantar et al. | |
| 10,694,722 B1 | 6/2020 | Holm et al. | |
| 10,748,278 B2 | 8/2020 | Brubacher | |
| 10,959,411 B2 | 3/2021 | Holm | |
| 11,425,895 B2 | 8/2022 | Holm et al. | |
| 11,596,132 B2 | 3/2023 | Holm | |
| 2003/0070624 A1 | 4/2003 | Zohar | |
| 2003/0104353 A1 | 6/2003 | Brielmeier et al. | |
| 2003/0121859 A1 | 7/2003 | Kelly et al. | |
| 2004/0168648 A1 | 9/2004 | Ayers | |
| 2004/0244715 A1 | 12/2004 | Schreier et al. | |
| 2005/0211644 A1 | 9/2005 | Goldman | |
| 2007/0221552 A1 | 9/2007 | Denney | |
| 2007/0242134 A1 | 10/2007 | Zernov | |
| 2008/0000821 A1 | 1/2008 | Drewelow | |
| 2008/0223788 A1 | 9/2008 | Rimdzius et al. | |
| 2009/0145368 A1 | 6/2009 | Brauman | |
| 2009/0250010 A1 | 10/2009 | Urusova et al. | |
| 2010/0081961 A1 | 4/2010 | Cox | |
| 2010/0236137 A1 | 9/2010 | Wu et al. | |
| 2010/0269761 A1 | 10/2010 | Nien | |
| 2011/0250604 A1 | 10/2011 | Cane et al. | |
| 2011/0258915 A1 | 10/2011 | Subhadra | |
| 2012/0103271 A1 | 5/2012 | Kong | |
| 2012/0125940 A1 | 5/2012 | Wright et al. | |
| 2012/0184001 A1 | 7/2012 | Stephen et al. | |
| 2013/0098303 A1 | 4/2013 | Jones | |
| 2013/0319342 A1 | 12/2013 | Musser | |
| 2013/0327709 A1 | 12/2013 | Stroot | |
| 2014/0261213 A1 | 9/2014 | Stiles, Jr. et al. | |
| 2015/0167045 A1 | 6/2015 | Brubacher | |
| 2015/0230439 A1 | 8/2015 | Harwood | |
| 2015/0250113 A1 | 9/2015 | Shoham et al. | |
| 2015/0256747 A1 | 9/2015 | Grotto et al. | |
| 2015/0342161 A1 | 12/2015 | Sheriff | |
| 2015/0366173 A1 | 12/2015 | Myers | |
| 2016/0356756 A1 | 12/2016 | Covi | |
| 2017/0260546 A1 | 9/2017 | Qimron et al. | |
| 2017/0299382 A1 * | 10/2017 | Yang | G01N 15/0227 |
| 2018/0125041 A1 | 5/2018 | Holm et al. | |
| 2019/0008126 A1 | 1/2019 | Shishehchian | |
| 2019/0071336 A1 | 3/2019 | Greenwald et al. | |
| 2019/0082661 A1 | 3/2019 | Lahav et al. | |
| 2019/0135393 A1 | 5/2019 | Pieterkosky | |
| 2019/0141964 A1 | 5/2019 | Perslow et al. | |
| 2019/0169046 A1 | 6/2019 | Holm | |
| 2019/0200584 A1 | 7/2019 | Holm | |
| 2020/0396970 A1 | 12/2020 | Holm et al. | |
| 2021/0127646 A1 | 5/2021 | Holm | |
| 2021/0195874 A1 | 7/2021 | Holm et al. | |
| 2021/0227807 A1 | 7/2021 | Holm et al. | |
| 2021/0235010 A1 | 7/2021 | Wallace et al. | |
| 2021/0274758 A1 | 9/2021 | Holm et al. | |
| 2021/0275604 A1 | 9/2021 | Holm | |
| 2021/0278378 A1 | 9/2021 | Holm | |

FOREIGN PATENT DOCUMENTS

| | | |
|---|---|---|
| GB | 2464686 | 4/2010 |
| JP | H01112935 | 5/1989 |
| WO | WO200241703 | 5/2002 |
| WO | WO2006042371 | 4/2006 |
| WO | WO2008094132 | 8/2008 |
| WO | WO2016154602 | 9/2016 |
| WO | WO2017002081 | 1/2017 |
| WO | WO017153986 | 9/2017 |
| WO | WO2018184029 | 4/2018 |
| WO | WO2018169412 | 9/2018 |
| WO | WO2021162847 | 8/2021 |
| WO | WO2021178080 | 9/2021 |
| WO | WO2021178431 | 9/2021 |
| WO | WO2021216225 | 10/2021 |
| WO | WO2021221745 | 11/2021 |

OTHER PUBLICATIONS

Garcia-Bencochea, Jose I. et al., Deep Well Disposal of Waste Waters in Saline Aquifers of South Florida, Abstract, American Geophysical Union Water Resources Research, Oct. 1970, 1 page, Oct. 1970.

Howard, Mark R., Down the Drain, Florida Trend, Jan. 1, 2000, hhtp://www.floridatrend.com/print/article/13274, 2 Pages, Jan. 1, 2000.

Gorman J. et al., Economic Feasibility of Utilizing West Alabama Saline Ground Water to Produce Florida Pompano and Hybrid Striped Bass in a Recirculating Aquaculture System, Alabama Agricultural Experiment Station, Auburn University, 19 Pages, Dec. 1, 2009.

Sharrer, Mark J. et al. Evaluation of Geotextile Filtration Applying Coagulant and Flocculant Amendments for Aquaculture, biosolids dewatering and phosphorus removal, Aquacultural Engineering, vol. 40, Issue 1, Jan. 2009, 10 Pages, <URL:https://www.sciencedirect.com/science/article/pii/S0144860908000678> (Accessed Dec. 4, 2017), Jan. 1, 2009.

Haberfeld, Joseph, Letter RE First Request for Additional Information (RAI), Florida Department of Environmental Protection, 6 pages, Jun. 4, 2013.

Storro, Gaute, Investigations of Salt groundwater at Akvaforsk Research Institute, Sunndalsora, Norway, Geological Survey of Norway, NGU—rapport 93.029, 1993, 11 pages, Jan. 1, 1993.

Milchman, Jon, Construction Clearance Permit Application, Florida Departmewnt of Environmental Protection, (FDEP), 5 pages, May 12, 2013.

Sun Min et al., Models for estimating feed intake in aquaculture, a review, abstract, Computers and Electornics in Agriculture, vol.

(56) References Cited

OTHER PUBLICATIONS

127, <URL:http://www.sciencedirect.com/science/article/pii/S0168169916304240> (Accessed Dec. 4, 2017), 4 pages, Sep. 2016.

South Dade News Leader, Homestead, Notice of Draft Pemit, Miade-Dade County, Florida, Sep. 13, 2013, 1 Page, Sep. 13, 2013.

South Dade News Leader, Notice of Intent, Homestead, Miade-Dade County, Florida, Oct. 18, 2013, 1 page, Oct. 18, 2013.

Florida Department of Environmental Protection, Notice of Permit, 18 pages, Nov. 4, 2013.

Lindholm-Lehto et al., Depuration of Geosmin and 2 mehtylisoborneol-induced off-flavors in recirculation aquacultre system (RAS) farmed European whitefish coregonus lavaretus, Jul. 10, 2019.

Sompong et al., Microbial Degradation of musty odor in aquaculture pond, International Journal of Agricultural Technology, Dec. 1, 2018.

Tucker et al., Managing Off-Flavor Problems in Pond-Raised Catfish, SRAC Publication, Oct. 5, 2018.

Small, Brian et al., On the Feasibility of Establishing a Saline Aquaculture Industry in Illinois, Illinois Sustainable Technology Center [online] <URL:http://www.istc.illinois.edu/info/library_docs/TR/TR051.pdf>, 46 Pages, Mar. 2014.

Akva Group, Recirculation Systems, 6 pages, <URL:http://www.akvagroup.com/products/land-based-aquaculture/recirculation systems> (Accessed Dec. 4, 2017).

State of Florida, Well Completion Report, Feb. 2015, 23 Pages, Feb. 2015.

Water Source, University of Alaska, Fairbanks, School of Fisheries & Ocean Sciences, 53 Pages, <URL:hhttps://www.sfos.uaf.edu/fitc/teaching/courses/fish336/materials/FISH%20336%20Letc%2031%20Water%20Quality%203.pdf> (Accessed), Dec. 4, 2017.

\* cited by examiner

SYSTEM AND METHOD FOR FEED VALIDATION MEASUREMENT

CLAIM OF PRIORITY

The present application claims priority under 35 U.S.C. Section 119 to a currently pending, U.S. Provisional application having Ser. No. 63/145,195 and filed on Feb. 3, 2021 which is incorporated by reference herein in its entirety.

BACKGROUND OF THE INVENTION

Field of the Invention

The present invention relates generally to utilizing an aquaculture system, or more specifically, a recirculating aquaculture system (RAS) for aquaculture farming and more specifically, the present invention relates to a method for collecting a sample of aquaculture feed and measuring various feed properties, such as size, color, and reflectivity, to ensure consistent feed quality. Further, the present invention relates to detecting and mitigating any inconsistencies in feed to ensure a desired flavor profile and a desired size of aquaculture, as well as ensure the health of aquaculture produced by a prospective RAS.

Description of the Related Art

Currently, there is a recognized alarming decline in conventional fisheries, which in turn is based on overfishing and harmful environmental happenings. At present, the demand for seafood exceeds the supply available from such conventional fisheries and it is predicted that with an increased world population, the demand for seafood will double in the immediate future. Accordingly, the inability of conventional fisheries to meet such an increasing demand for seafood has resulted in an equally increasing need for aquaculture systems or "fish farms" capable of significantly high volume of seafood production.

At the present day, a recirculating aquaculture system (RAS) is commonly used in the aquaculture farming industry. Essentially, an RAS provides an aquaculture farming production a means for a financially favorable production method, at least through limiting water consumption for use in farming. RAS's have proven to be highly effective in the art of aquaculture farming and are being adopted all over the world. Although RAS's are generally well-received by the industry, when used, issues in aquaculture developing non-desired flavor profiles and RAS's experiencing unfavorable conditions are becoming more prevalent in conjunction with RAS farming. These issues are believed to be caused at least by the naturally occurring compound, Geosmin, which is an organic compound known to make water smell and taste foul to the average person. Further, these issues are also somewhat believed to be caused at least by the naturally occurring compound, 2-Methylisoborneol (MIB), which is an organic chemical also known to make water smell and taste foul to the average person. It is also known that these compounds are produced by microbiota, and/or a wide range of bacteria wherein when environmental conditions are fit, the microbiota will naturally produce such compounds. Evidence for these beliefs are at least found in tasting samples of non-desirably flavored aquacultures produced in an RAS, wherein the samples of the aquacultures have been found to contain chemical concentrations of the compounds, Geosmin and 2-Methylisoborneol and in testing for specific microbiota in absence and in presence of the two compounds. Thus, it becomes apparent that these issues are becoming more prevalent in RAS's and plausibly, are known to be caused by both Geosmin and MIB. Subsequently, the two compounds have been known to be called "off-flavors" or "off-flavorings" or singularly, an "off-flavor." In some cases, an off-flavor may also be an organic bromo-compound. Such "off-flavors" are undesirable.

As mentioned above, an aquaculture farming operation may experience a wide range of complications while undergoing the act of farming aquaculture. Complications from degrading water quality, nutrient imbalances within the water, harmful algae growth, inconsistent aquaculture feed, harmful organic-compound growth and/or production, declining aquaculture health, aquaculture development of disease, aquaculture death, aquaculture flavor profile degradation, and more are sure to arise in most aquaculture farming operations at some point in a farming cycle. In some cases, such complications are unable to be detected until the aquaculture farming operation has experienced negative consequences. In such cases, experiencing negative consequences may be, but not be limited to, operating at a financial loss, degradation of product (aquaculture), infected and/or un-sellable product (aquaculture), deterioration of farming facilities, and/or overworking of farming facilities. Generally, all such experiences related to the negative consequences of complications in farming aquaculture will lead to a detraction of profitability from an aquaculture farming operation.

It becomes apparent that introduction of any substance to the RAS and the aquaculture, including aquaculture feed, can be harmful if not monitored closely for quality. Without the ability to monitor aquaculture feed properties such as size, color, and reflectivity of feed pellets, aquaculture may receive an inconsistent, suboptimal amount of feed or experience conditions harmful to aquaculture health and flavor profile. To illustrate this point, aquaculture are typically provided with a particular measurement of feed, but where some feed pellets are larger than optimal, there may not be enough pellets to appropriately nourish all aquaculture. On the other hand, where some feed pellets are smaller than optimal, there is potential for aquaculture to overconsume or for some unconsumed pellets to linger in the water, thereby altering the aquaculture environment by introducing chemicals or oils. In addition feed pellet size, it would be beneficial to monitor feed pellet coloring as an indicator of feed moisture levels, as well as feed pellet reflectivity as an indication of feed oiliness levels. Such properties are important because feed with suboptimal moisture or oil levels may negatively impact aquaculture health and flavor profile through aquaculture consumption of feed or through environmental exposure to RAS water altered by the feed.

SUMMARY OF THE INVENTION

In view of the foregoing disadvantages that come with RAS farming, the present invention is directed to a feed validation system for monitoring aquaculture feed quality by collecting a predetermined quantity of aquaculture feed pellets, a representative sample of the entire bag of feed, and measuring feed pellet properties such as size, color, and reflectivity to determine feed validity. Thus, the present invention relates to detecting and mitigating any inconsistencies in or suboptimal properties of feed to ensure a desired flavor profile and maintain the desired size and health of aquaculture produced by a prospective RAS.

In more specific terms, the feed validation system is comprised of a high contrast surface, a camera assembly, a software component, and a lighting assembly. In one embodiment, the high contrast surface, camera assembly, and lighting assembly may be disposed within a housing unit, such as a box-shaped structure that may or may not have open sides.

The high contrast surface is structured to receive a predetermined number of pellets and a measurement reference object of a known measurement. By way of non-limiting example, the high contrast surface may consist of an acrylic sheet with a privacy film on one side and a regular sheet of paper on the other. The high contrast surface acts to diffuse light from the lighting assembly such that the software component does not erroneously account for individual spots of light as an article for measurement or reference. The measurement reference object is used to determine individual pellet sizes by comparison to the known size or measurement of such reference object. By way of non-limiting example, a U.S. dime could serve as a measurement reference object due to its known size.

Aquaculture feed pellets may be introduced to or placed atop the high contrast surface in a variety of ways. By way of non-limiting example, the predetermined number of feed pellets may be manually counted out and placed on the high contrast surface. In another embodiment, the high contrast surface may be recessed, the recessed surface comprising a plurality of recesses structured to receive and removably retain the predetermined number of pellets therein. The number of recesses on the surface may be equivalent to the predetermined number of feed pellets. In using such an embodiment, an unknown number of feed pellets from the supply might be poured, dropped, or placed onto the high contrast surface, but only the predetermined number of feed pellets would settle into the recesses. In yet another embodiment, a pellet transfer device may be used to introduce the predetermined number of feed pellets to the high contrast surface from a bag of feed. In one embodiment, such a pellet transfer device may be comprised of a tray having a predetermined number of individual pellet-receiving receptacles, perhaps in the form of small divots, pockets, or cups, that can catch, scoop, or grab the predetermined number of feed pellets when run through a bag of feed.

The camera assembly, which is comprised of a camera and a camera mount in one embodiment, is structured to capture images of the pellets and measurement reference object on the high contrast surface. In the preferred embodiment, the lighting assembly is comprised of light-emitting diodes (LEDs) and is disposed below the high contrast surface. The lighting assembly assists the camera assembly in the production of clear, high contrast images and, more specifically, helps generate high contrast in the images between dark and light areas where the dark areas are the feed pellets. To assist in the production of a high contrast image, the high contrast surface may be disposed on a support assembly such that the high contrast surface is held above the lighting assembly. The images taken by the camera assembly are transmitted to a software component, through which the camera assembly may be operative or exist and function as a part of.

The software component then identifies and counts the number of feed pellets in the image. It is noteworthy that, in one embodiment, before the software component engages in such identification and counting, there may be an image post-processing process conducted to color-correct the image and make the edges of the pellets easier to see. The software component then measures each pellet's individual size by comparison to the known size or measurement of the measurement reference object. In the preferred embodiment, the feed pellet measurements are transmitted to a human-readable format. By way of non-limiting example, such measurements could be read on a computer by a human through the software itself, or through a computer spreadsheet program or other program if exported by the software.

Once the feed pellet sizes have been determined by the software component, the sizes are compared to a predetermined pellet size validation standard to check feed quality. In addition to checking the size of feed pellets, the images captured by the camera assembly can also be used to determine additional properties of the feed pellets including, but not limited to, pellet color and pellet reflectivity. Using these two properties as an example, feed pellet color may be an indication of feed moisture level and feed pellet reflectivity may be an indication of feed oiliness levels, both of which have the potential to impact aquaculture health through consumption or environmental exposure. The findings regarding a particular batch of feed from software component and the camera assembly may be compared to a set of predetermined validation standards such as desired pellet size, pellet color, and pellet reflectivity to decide whether the feed is of appropriate quality.

This feed validation measuring system is advantageous because it provides a means by which aquaculture feed ingested to aquaculture and introduced to their environment can be monitored for quality and consistency. The ability to monitor feed properties for validity ensures healthy aquaculture with a desired flavor profile, meaning that product (aquaculture) loss due to malnourishment, disease, or undesirable flavor profile is minimized. As a result, the RAS farm operation is more profitable for the "fish farmer."

More specifically, this system's ability to monitor aquaculture feed properties such as size, color, and reflectivity ensures that feed is of the appropriate quality, and is distributed to aquaculture in the appropriate quantities. The system thereby ensures that aquaculture is receiving enough feed to achieve the desired size, health, and flavor profile. While the system primarily emphasizes monitoring feed pellet size, the system is also beneficial due to its ability to check the other aforementioned feed properties (color and reflectivity) that can impact the aquaculture's health via feed ingestion and via introduction of the feed to the aquaculture environment (RAS water). For example, feed pellet coloring can be indicative of feed moisture levels, and feed pellet reflectivity can serve as an indication of feed oiliness levels. Both moisture and oiliness levels can impact the health and flavor profile of the aquaculture, as some levels of each are more desirable than others. Such properties not only have the potential to impact aquaculture after ingestion, but may impact aquaculture by contaminating or altering the RAS environment. This system allows for the detection of feed that, if dropped into the RAS environment, may introduce harmful levels of oils or other substances that negatively impact water quality or other conditions impactful on aquaculture health and flavor profile. As should be apparent, the system's ability to monitor the quality of aquaculture feed is extremely beneficial to the aquaculture operations.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The aquaculture system in which aquaculture are raised and farmed can be, and will be, referred to as a recirculating aquaculture system (RAS). Turning now descriptively to the figures, FIGS. 1 and 2 illustrate an inventive feed validation measuring system to monitor and control the quality of aquaculture feed introduced to aquaculture in an RAS.

Figure 1:
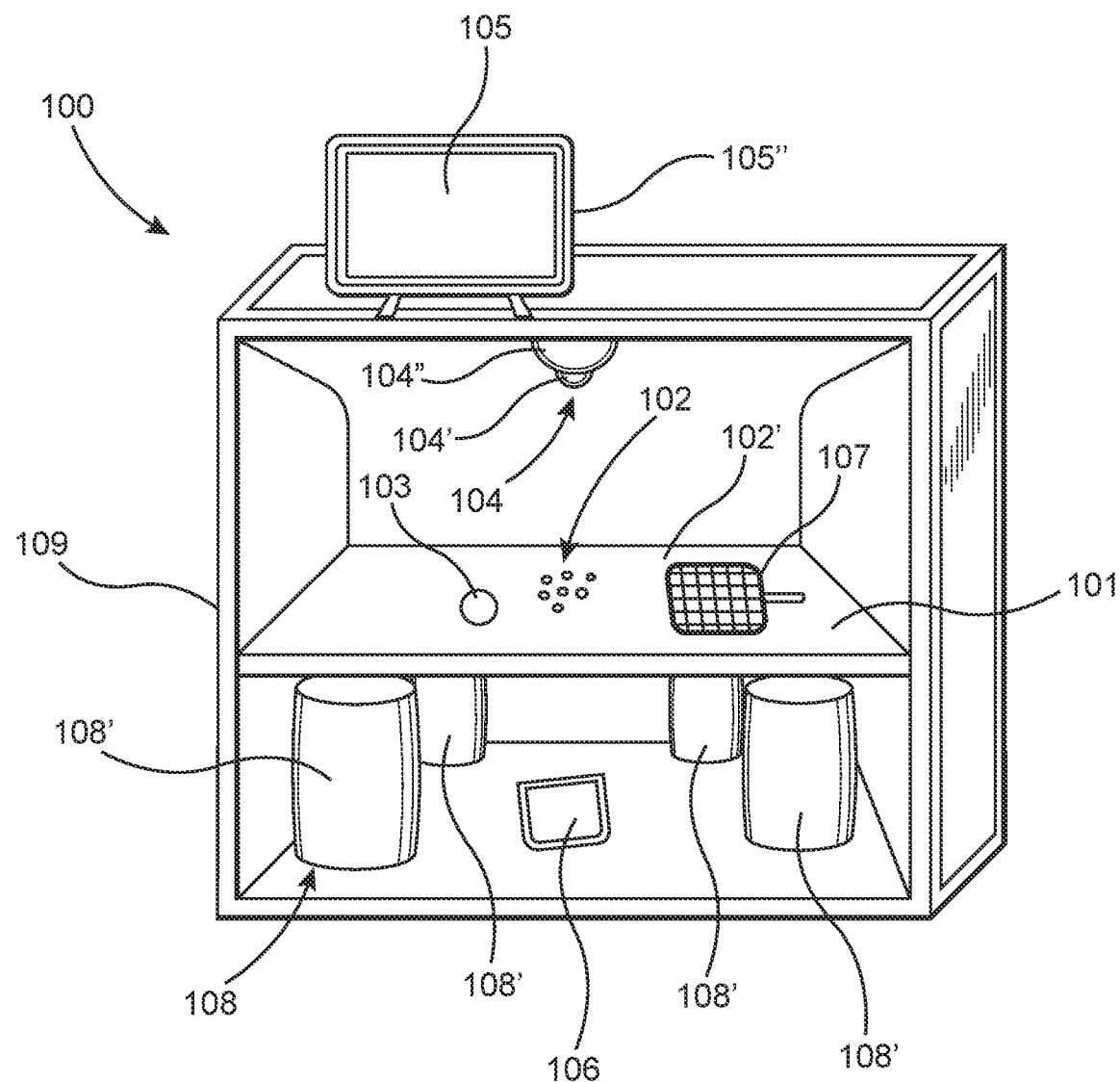
FIG. 1 is a schematic, front perspective view of the feed validation measuring system.
Figure 2:
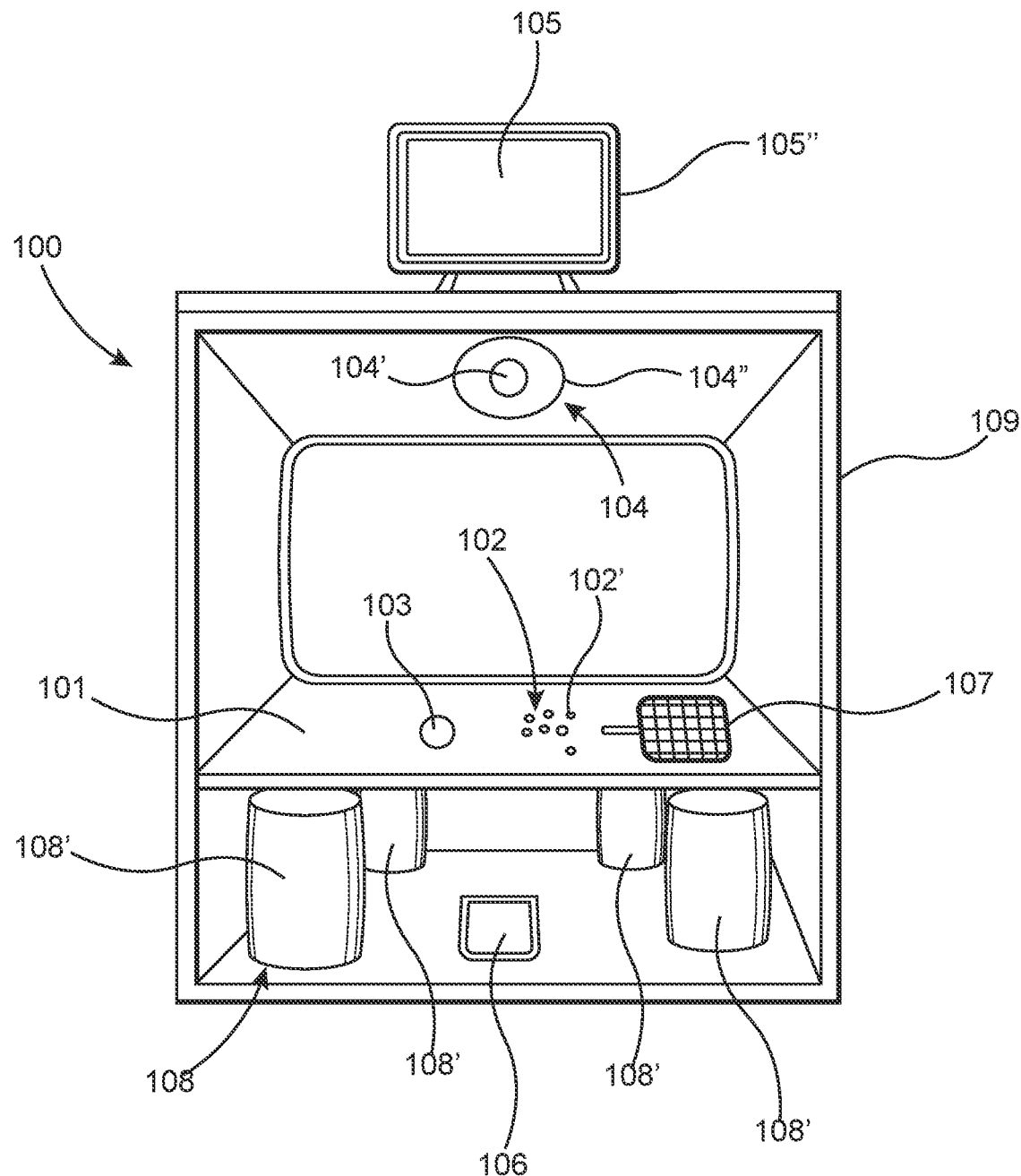
FIG. 2 is a schematic, front perspective view of the feed validation measuring system at a slightly upward angle.

FIGS. 1 and 2 show that the feed validation measuring system 100 is primarily comprised of a high contrast surface 101, a camera assembly 104, a lighting assembly 106, and a software component 105. In another embodiment, the system 100 may also include a support assembly 108 and/or a computer monitor 105' through which the software component 105 may be controlled. Further, in yet another embodiment, some or all parts of the system 100 may be disposed on or within a housing unit 109, which may serve to provide structure, support, and organization to the physical parts of the system 100.

The high contrast surface 101 is structured to receive a predetermined number of pellets 102 and a measurement reference object 103. Serving as a representative sample of the entire feed supply, the predetermined number of pellets 102 are comprised of individual feed pellets 102' selected from the supply. For clarity, a reference to the individual feed pellets 102' is not a reference to any pellet in the supply—the individual feed pellets 102' are only those in the group comprising the predetermined number of feed pellets 102. The high contrast surface 101 acts to diffuse light from the lighting assembly 106 such that the software component 105 does not erroneously account for individual spots of light as an object for measurement or reference. In one embodiment, the high contrast surface 101 is an acrylic sheet with a privacy film on one side and a regular sheet of paper on the other. However, the high contrast surface 101 may be formed of any other material that can achieve the desired high contrast result, such as photonic glass or other high contrast fiberglass. Additionally, the measurement reference object 103 is used to determine the sizes of the individual pellets 102' by comparison to the known size of such measurement reference object 103. In the preferred embodiment, the measurement reference object 103 may be, but is not limited to, a relatively small object of comparable size to an individual feed pellet 102'. By way of non-limiting example, a U.S. dime could effectively serve as the measurement reference object 103 due to its known size, and may also effectively serve as the measurement reference object 103 due to its size comparability or size similarity to any individual feed pellet 102'.

Aquaculture feed pellets 102' may be introduced to the high contrast surface 101 in many different ways. In one embodiment, the predetermined number of feed pellets 102 may be manually counted out and placed on the high contrast surface 101. In another embodiment, the high contrast surface 101 may be recessed and dimensioned such that the number of recesses is equivalent to the predetermined number of feed pellets 102. In such an embodiment, an unknown number of individual feed pellets 102' might be poured, dropped, or placed onto the high contrast surface 101, but only the predetermined number of feed pellets 102 would settle into the recesses. In yet another embodiment, a pellet transfer device 107 may be used to introduce the predetermined number of feed pellets 102 to the high contrast surface 101 from a bag of feed. By way of non-limiting example, such a pellet transfer device 107 may be comprised of a tray having a predetermined number of individual pellet-receiving receptacles, perhaps in the form of small divots, pockets, or cups, that can catch, scoop, or grab the predetermined number of feed pellets 102 when run through a container of aquaculture feed.

Depicted in more detail in FIG. 2, the camera assembly 104, which is comprised of a camera 104' and a camera mount 104" in one embodiment, is structured to capture images of the predetermined number of pellets 102 and measurement reference object 103 on the high contrast surface 101. In the preferred embodiment, the camera assembly 104, or more specifically the camera mount 104", is removably attached or affixed to the housing unit 109 and the camera 104' points down at the high contrast surface 101. The camera mount 104" may be formed of any material capable of supporting the camera 104', such as metal, plastic, or other polymers and three-dimensionally printable material. In the preferred embodiment, the camera mount 104" is formed of a relatively light, yet strong and durable, plastic.

Furthermore, in the preferred embodiment, the lighting assembly 106 is comprised of light-emitting diodes (LEDs) and is disposed below the high contrast surface 101, with a support assembly 108 holding the high contrast surface 101 at a desirable height above the lighting assembly 106. The LEDs comprising the lighting assembly 106 may be of any form, such as LED strips or LED bars. The composition of the lighting assembly 106 is not, however, limited to LEDs and may be formed from other light sources such as incandescent light bulbs, compact fluorescent light bulbs (CFLs), halogen light bulbs, metal halide lamps, high pressure sodium (HPS) lamps, low pressure sodium (LPS) lamps, phosphor-converted amber (PCA) lamps, narrow-band amber (NBA) lamps, and other light sources. In the preferred embodiment, the lighting assembly 106 is disposed on the inside and at the bottom of the housing unit 109, and shines upwards at the high contrast surface 101 to illuminate the predetermined number of feed pellets 102 from underneath.

The lighting assembly 106 assists the camera assembly 104 in the production of clear, high contrast images and, more specifically, helps generate high contrast in the images between dark and light areas where the dark areas are the predetermined number of feed pellets 102. In the preferred embodiment, to assist in the production of a high contrast image, the high contrast surface 101 may be disposed on a support assembly 108 such that the high contrast surface 101 is held or suspended above the lighting assembly 106 at a desirable vertical distance. The support assembly 108 may consist of one or more individual supports 108' capable of individually or collectively supporting the high contrast surface 101 above the lighting assembly 106. By way of non-limiting example, blocks or containers may be used as individual supports 108' for the support assembly 108. In the preferred embodiment, the individual supports 108' are all the same height, and one support 108' is placed under each corner of the high contrast surface 101 for maximum stability.

The images taken by the camera assembly 104 are transmitted to a software component 105, through which the camera assembly 104 may be operative or exist and function as a part of. In one embodiment, the software component 105 and/or the camera assembly 104 may be controlled or operative through a computer monitor 105'. After receiving the image taken by the camera assembly 104, the software component 105 identifies and counts the predetermined number of feed pellets 102 captured in the image. In one embodiment, before the software component 105 identifies and counts the predetermined number of feed pellets 102 in the image, there may be an image post-processing process conducted to color-correct the image and make the edges of each individual feed pellet 102' more defined. The software component 105 then measures the size of each individual feed pellet 102' by comparing each to the known size or measurement of the measurement reference object 103. In the preferred embodiment, the measurements collected by the software component 105 are translated to a human-readable format. In one embodiment, such measurements might be read by a human on a computer monitor 105' through the software component 105 itself, or through a different computer program or application. The measurements taken by the software component 105 are exported into a computer spreadsheet program, either manually or automatically, in the preferred embodiment.

Once the individual size of each individual feed pellet 102' has been determined by the software component 105, the size of each feed pellet 102' is compared to a predetermined pellet size validation standard to ensure feed quality. While the system 100 focuses primarily on monitoring the quality of feed pellet 102' size, the images captured by the camera assembly 104 may be used to check other properties of the bag of feed including, but not limited to, color and reflectivity. For example, because the predetermined number of pellets 102 serve as a representative sample of the entire bag of feed, the color of the predetermined number of pellets 102 may indicate feed moisture levels and reflectivity of the predetermined number of pellets 102 may be an indication of feed oiliness levels. The ability of the system 100 to monitor these additional properties is beneficial, as feed moisture and oiliness have the potential to impact aquaculture health, whether through consumption or environmental exposure in the RAS. By utilizing the images from the camera assembly 104 and the measurements from the software component 105, the findings regarding the pellets' additional properties may be compared to a set of predetermined validation standards, such as desired pellet color, and pellet reflectivity. By comparing the pellet size to the predetermined pellet size validation standard and the additional properties to their corresponding predetermined validation standards, the user of the system 100 is able to decide whether the bag of aquaculture feed, from which the predetermined number of feed pellets 102 were sampled, is of appropriate quality.

Figure 3:
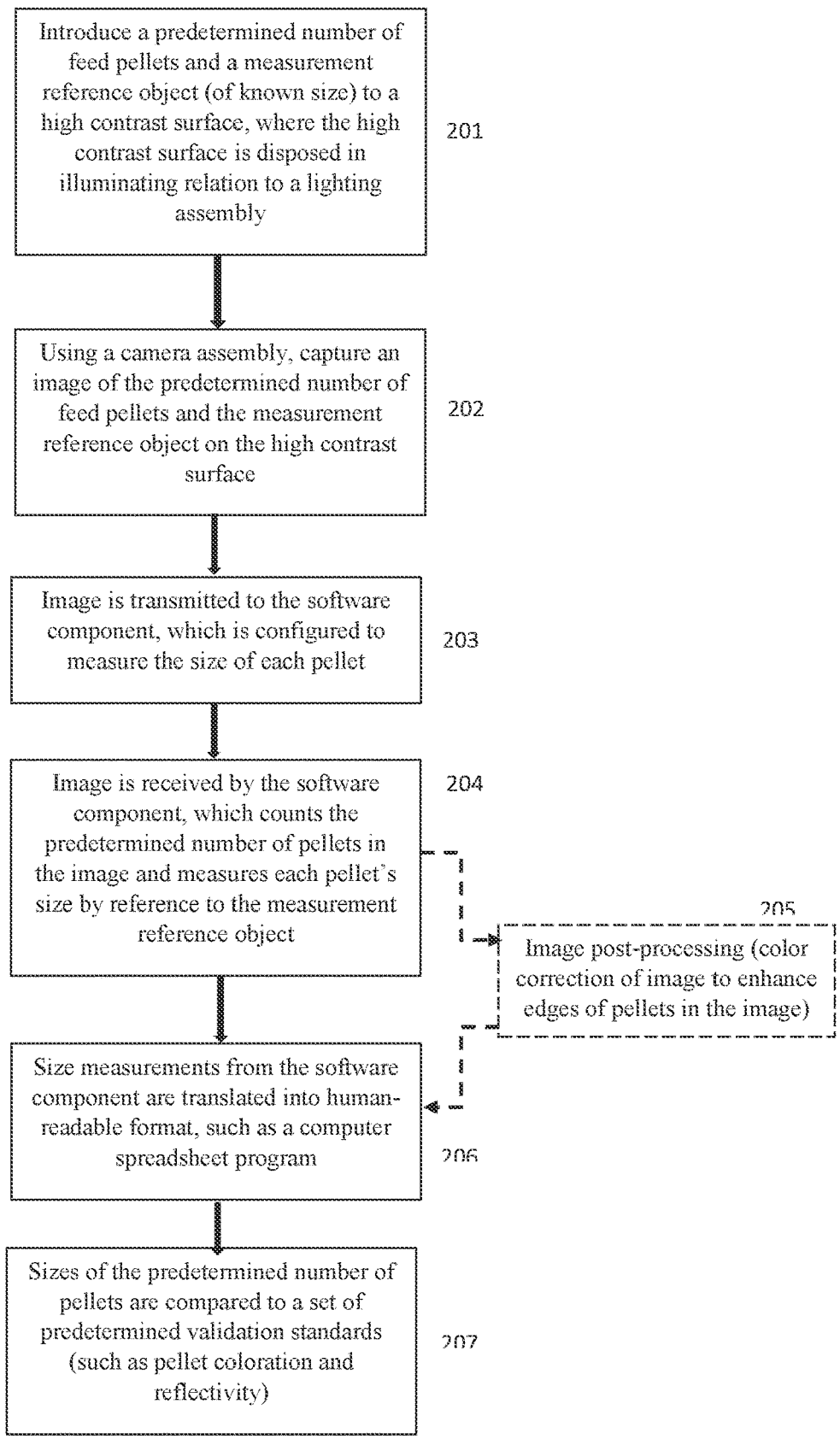
FIG. 3 is a flowchart illustrating the overall process of the present invention of a method for validating feed.

FIG. 3 outlines the preferred method for feed measurement validation, with the parts shown in FIG. 1 and FIG. 2. First, the predetermined number of feed pellets 102 and the measurement reference object 103 are introduced 201 to the high contrast surface 101, where the high contrast surface 101 is disposed in illuminating relation to the lighting assembly 106. Next, at least one image is captured 202 of the predetermined number of pellets 102 and the measurement reference object 103 on the high contrast surface 101, collectively, using the camera assembly 104. Afterwards, the at least one image is transmitted 203 to the software component 105, which is configured to measure the size of each pellet. The image is then received 204 by the software component 105, which counts the predetermined number of pellets 102 in the at least one image and measures the size of each individual pellet 102' by reference to the measurement reference object 103. Before the sizes are measured by the software component 105, an image post-processing process 205 may be executed to color-correct the image and enhance the appearance of the edges of the predetermined number of pellets 102 in the image. Then, the size measurements calculated by the software component 105 are translated 206 into a human-readable format, such as a computer spreadsheet program. Subsequently, the sizes of the predetermined number of pellets 102 are compared 207 to a set of predetermined validation standards, including properties indicative of quality such as pellet coloration and reflectivity.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A feed validation measuring system, said system comprising:
   a high contrast surface structured to receive a predetermined number of pellets and a measurement reference object;
   a lighting assembly that illuminates said predetermined number of pellets and said measurement reference object;
   a camera assembly structured to capture at least one image collectively comprising the predetermined number of feed pellets and the measurement reference object disposed on said high contrast surface;
   a software component configured to measure the individual sizes of each of the predetermined number of pellets, as represented in said at least one image, through comparison to the size of the measurement reference object.

2. The feed validation measuring system of claim 1, wherein the measurement reference object is an object of known size.

3. The feed validation measuring system of claim 1, wherein said high contrast surface contains a predetermined number of recesses, said predetermined number of recesses equal in number to the predetermined number of pellets, structured to receive and removably retain the predetermined number of pellets therein.

4. The feed validation measuring system of claim 1, wherein said high contrast surface is structured to receive the predetermined number of pellets from a pellet transfer device.

5. The feed validation measuring system of claim 1, wherein said lighting assembly is comprised of light-emitting components.

6. The feed validation measuring system of claim 5, wherein said lighting assembly is disposed beneath said high contrast surface in illuminating relation thereto.

7. The feed validation measuring system of claim 6, wherein said lighting assembly is comprised of light-emitting diodes.

8. The feed validation measuring system of claim 1, wherein said high contrast surface is disposed on a support assembly, said support assembly comprised of at least one support structured to maintain said high contrast surface in vertical relation to said lighting assembly.

9. The feed validation measuring system of claim 1, wherein said camera assembly is comprised of a camera and a camera mount.

10. The feed validation measuring system of claim 1, wherein said camera assembly is structured to transmit said at least one image to said software component.

11. The feed validation measuring system of claim 10, wherein said camera assembly is operative through said software component on a computer system.

12. The feed validation measuring system of claim 1, wherein said high contrast surface, said lighting assembly, and said camera assembly are disposed within a housing unit.

13. A method for validating feed comprising:
introducing a predetermined number of pellets and a measurement reference object, the measurement reference object being an object of known size, to a high contrast surface and the high contrast surface disposed in illuminating relation to a lighting assembly;
capturing at least one image collectively comprising the predetermined number of feed pellets and the measurement reference object disposed on the high contrast surface with a camera assembly;
transmitting the at least one image to a software component and measuring the size of each of the predetermined number of pellets, via the software component; and
comparing the sizes of the predetermined number of pellets to a predetermined pellet size validation standard as determined by said software component.

14. The method of claim 13, comprising receiving the at least one image at the software component and identifying and counting the predetermined number of pellets and measuring the individual sizes of each by reference to the measurement reference object.

15. The method of claim 14, comprising conducting an image post-processing process before the software component identifies and counts the predetermined number of pellets, the image post-processing process involving color correction of the at least one image to enhance the edges of the predetermined number of pellets.

16. The method of claim 14, comprising translating the size measurements of the predetermined number of pellets to a human-readable format via the software component.

17. The method of claim 16, wherein the human-readable format is comprised of a computer spreadsheet program.

18. The method of claim 14, comprising comparing the size measurements to a predetermined pellet size validation standard and evaluating for quality.

19. The method of claim 13, comprising revealing additional properties of the predetermined number of pellets by the at least one image and comparing the additional properties to a set of predetermined validation standards.

20. The method of claim 19, comprising defining the set of predetermined validation standards to include pellet coloration and pellet reflectivity.

* * * * *